US010907575B2

(12) United States Patent
Bakken

(10) Patent No.: US 10,907,575 B2
(45) Date of Patent: Feb. 2, 2021

(54) METHODS AND APPARATUS FOR SEALING VARIABLE AREA FAN NOZZLES OF JET ENGINES

(71) Applicant: The Boeing Company, Chicago, IL (US)

(72) Inventor: David Alan Bakken, Weatherford, TX (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 15/980,476

(22) Filed: May 15, 2018

(65) Prior Publication Data

US 2018/0258880 A1     Sep. 13, 2018

Related U.S. Application Data

(63) Continuation of application No. 13/665,188, filed on Oct. 31, 2012, now Pat. No. 9,989,009.

(51) Int. Cl.
| | |
|---|---|
| *F02K 1/12* | (2006.01) |
| *F02K 1/30* | (2006.01) |
| *F02K 1/80* | (2006.01) |
| *F16J 15/02* | (2006.01) |
| *B64C 15/02* | (2006.01) |

(Continued)

(52) U.S. Cl.
CPC ............ *F02K 1/1207* (2013.01); *F02K 1/805* (2013.01); *B64C 15/02* (2013.01); *F02K 1/06* (2013.01); *F02K 1/30* (2013.01); *F02K 1/70* (2013.01); *F02K 1/72* (2013.01); *F02K 1/78* (2013.01); *F16J 15/00* (2013.01); *F16J 15/02* (2013.01); *Y02T 50/60* (2013.01)

(58) Field of Classification Search
CPC .......... F02K 1/30; F02K 1/1207; F02K 1/566; F02K 1/56; B64D 29/00; B64D 29/06; B64C 7/02
See application file for complete search history.

(56) References Cited

U.S. PATENT DOCUMENTS

| | | | |
|---|---|---|---|
| 2,651,172 | A | 9/1953 | Kennedy |
| 2,797,547 | A | 7/1957 | Meulien et al. |

(Continued)

FOREIGN PATENT DOCUMENTS

| | | |
|---|---|---|
| EP | 2444645 | 4/2012 |
| FR | 2907421 | 4/2008 |

(Continued)

OTHER PUBLICATIONS

Canadian Intellectual Property Office, "Examiner's Report," issued in connection with Canadian Patent Application No. 2,822,240 dated Mar. 16, 2016, 4 pages.

(Continued)

*Primary Examiner* — Craig Kim
*Assistant Examiner* — Alyson Joan Harrington
(74) *Attorney, Agent, or Firm* — Hanley, Flight & Zimmerman, LLC

(57) ABSTRACT

Methods and apparatus for sealing variable area fan nozzles of jet engines are disclosed. An apparatus in accordance with the teachings of this disclosure includes a frame and a seal to be coupled to the frame. The seal to enclose petals of a variable area fan nozzle to substantially prevent airflow between the petals.

20 Claims, 12 Drawing Sheets

(51) Int. Cl.
*F02K 1/78* (2006.01)
*F02K 1/70* (2006.01)
*F16J 15/00* (2006.01)
*F02K 1/06* (2006.01)
*F02K 1/72* (2006.01)

(56) References Cited

U.S. PATENT DOCUMENTS

| | | | |
|---|---|---|---|
| 3,090,198 A | 5/1963 | Zeisloft | |
| 3,279,192 A | 10/1966 | Hull et al. | |
| 3,785,567 A * | 1/1974 | Fisher | F02K 1/06 239/265.39 |
| 3,892,358 A | 7/1975 | Gisslen | |
| 4,132,068 A | 1/1979 | Johnston | |
| 4,141,501 A | 2/1979 | Nightingale | |
| 4,196,856 A | 4/1980 | James | |
| 4,657,476 A | 4/1987 | Berg | |
| 4,807,434 A | 2/1989 | Jurich | |
| 4,813,608 A | 3/1989 | Holowach et al. | |
| 4,826,106 A | 5/1989 | Anderson | |
| 4,994,660 A | 2/1991 | Hauer | |
| 5,039,014 A | 8/1991 | Lippmeier | |
| 5,076,496 A | 12/1991 | Lippmeier | |
| 5,174,502 A | 12/1992 | Lippmeier et al. | |
| 5,232,158 A | 8/1993 | Barzca | |
| 5,329,763 A | 7/1994 | Ibarreche Mendia et al. | |
| 5,335,489 A | 8/1994 | Thayer | |
| 5,364,029 A | 11/1994 | Barcza | |
| 5,398,499 A | 3/1995 | Urruela | |
| 5,485,959 A | 1/1996 | Wood et al. | |
| 5,778,659 A | 7/1998 | Duesler et al. | |
| 5,782,432 A | 7/1998 | Renshaw | |
| 5,797,544 A | 8/1998 | Ward | |
| 5,806,302 A | 9/1998 | Cariola et al. | |
| 6,318,070 B1 | 11/2001 | Rey et al. | |
| 6,357,672 B1 | 3/2002 | Cowan et al. | |
| 6,718,752 B2 | 4/2004 | Nesbitt et al. | |
| 7,000,378 B2 | 2/2006 | Birch et al. | |
| 7,085,388 B2 | 8/2006 | Butler et al. | |
| 7,093,423 B2 | 8/2006 | Gowda et al. | |
| 7,096,661 B2 | 8/2006 | Bush et al. | |
| 7,216,831 B2 | 5/2007 | Wood | |
| 7,240,493 B2 | 7/2007 | Seiner | |
| 7,458,221 B1 | 12/2008 | Arnold et al. | |
| 7,600,384 B2 | 10/2009 | Chanez et al. | |
| 7,721,549 B2 | 5/2010 | Baran | |
| 8,047,004 B2 | 11/2011 | Brown et al. | |
| 8,156,727 B2 | 4/2012 | Dijoud et al. | |
| 8,276,364 B2 | 10/2012 | Levasseur | |
| 8,375,699 B1 | 2/2013 | Atassi et al. | |
| 8,397,485 B2 | 3/2013 | Wood et al. | |
| 8,800,260 B2 | 8/2014 | Chaudhry | |
| 9,021,813 B2 | 5/2015 | Jasklowski et al. | |
| 9,181,898 B2 | 11/2015 | Bhatt | |
| 2002/0064455 A1 | 5/2002 | Toffan et al. | |
| 2003/0126856 A1 | 7/2003 | Lair | |
| 2003/0145599 A1 | 8/2003 | Renggli et al. | |
| 2005/0229585 A1 | 10/2005 | Webster | |
| 2007/0186555 A1 | 8/2007 | Peters | |
| 2007/0217913 A1* | 9/2007 | Fournier | B64D 29/08 416/129 |
| 2008/0000235 A1 | 1/2008 | Hanson | |
| 2008/0092548 A1 | 4/2008 | Morford et al. | |
| 2008/0190095 A1 | 8/2008 | Baran | |
| 2009/0067993 A1 | 3/2009 | Roberge et al. | |
| 2009/0235638 A1 | 9/2009 | Jain et al. | |
| 2009/0297338 A1 | 12/2009 | Lord et al. | |
| 2010/0000199 A1 | 1/2010 | McVey | |
| 2010/0018212 A1 | 1/2010 | Core | |
| 2010/0037588 A1 | 2/2010 | Baltas et al. | |
| 2010/0043390 A1 | 2/2010 | Jain et al. | |
| 2010/0050595 A1 | 3/2010 | Migliaro, Jr. et al. | |
| 2010/0058769 A1 | 3/2010 | Baran | |
| 2010/0064659 A1* | 3/2010 | Wang | F02K 1/763 60/226.2 |
| 2010/0107600 A1 | 5/2010 | Hillel et al. | |
| 2010/0115958 A1 | 5/2010 | Parham | |
| 2010/0170261 A1 | 7/2010 | Stieger et al. | |
| 2011/0030380 A1 | 2/2011 | Widdle, Jr. et al. | |
| 2011/0167790 A1 | 7/2011 | Cloft et al. | |
| 2011/0232262 A1 | 9/2011 | Barry, Jr. et al. | |
| 2011/0271685 A1 | 11/2011 | West | |
| 2011/0277448 A1 | 11/2011 | Roberts | |
| 2011/0318173 A1 | 12/2011 | Ramlaoui et al. | |
| 2012/0321456 A1 | 12/2012 | Calder et al. | |
| 2013/0020408 A1 | 1/2013 | Jasklowski et al. | |
| 2013/0167505 A1 | 7/2013 | Gormley | |
| 2013/0200178 A1 | 8/2013 | Welch et al. | |
| 2013/0306755 A1 | 11/2013 | Dittmann et al. | |
| 2014/0027537 A1 | 1/2014 | Binks et al. | |
| 2014/0117113 A1 | 5/2014 | Bakken | |
| 2014/0237990 A1 | 8/2014 | Atassi et al. | |
| 2014/0338324 A1 | 11/2014 | Jasklowski | |
| 2015/0000305 A1 | 1/2015 | Jasklowski | |
| 2016/0169158 A9 | 6/2016 | Ramlaoui et al. | |
| 2016/0208641 A9 | 7/2016 | Amkraut et al. | |
| 2016/0237949 A1 | 8/2016 | Ferrier et al. | |
| 2016/0281639 A1 | 9/2016 | Jackowski et al. | |

FOREIGN PATENT DOCUMENTS

| | | |
|---|---|---|
| GB | 2372779 | 9/2002 |
| WO | 2008045081 | 4/2005 |

OTHER PUBLICATIONS

Canadian Intellectual Property Office, "Office Action," issued in connection with Canadian Patent Application No. 2,822,240 dated Mar. 1, 2017, 4 pages.

European Patent Office "Extended European Search Report," issued in connection with European Patent Application No. 13191146.3 dated Jan. 29, 2018, 8 pages.

United Stated Patent and Trademark Office "Notice of Allowance and Fees Due" issued in connection with U.S. Appl. No. 13/665,188, dated Feb. 7, 2018, 19 pages.

United States Patent and Trademark Office "Office Action" issued in connection with U.S. Appl. No. 13/665,188, dated Dec. 29, 2016, 45 pages.

United States Patent and Trademark Office "Office Action" issued in connection with U.S. Appl. No. 13/665,188, dated Jul. 27, 2015, 12 pages.

United States Patent and Trademark Office "Office Action" issued in connection with U.S. Appl. No. 13/665,188 dated Jun. 6, 2017, 30 pages.

United States Patent and Trademark Office "Office Action" issued in connection with U.S. Appl. No. 13/665,188 dated Dec. 24, 2015, 21 pages.

United States Patent and Trademark Office "Advisory Action" issued in connection with U.S. Appl. No. 13/665,188 dated Aug. 8, 2017, 3 pages.

United States Patent and Trademark Office "Advisory Action" issued in connection with U.S. Appl. No. 13/665,188 dated Mar. 22, 2016, 6 pages.

Canadian Intellectual Property Office, "Office Action", issued in connection with Canadian application No. 3,012,925 dated May 2, 2019, 4 pages.

Canadian Intellectual Property Office, "Replacement Office Action", issued in connection with Canadian application No. 3,012,925 dated Aug. 1, 2019, 3 pages.

European Patent Office, "Examination Report," issued in connection with European Patent Application No. 13191146.3, dated Aug. 30, 2018, 5 pages.

European Patent Office, "Communication Pursuant to Article 94(3) EPC", issued in connection with application No. 13191146.3 dated Feb. 11, 2020, 4 pages.

* cited by examiner

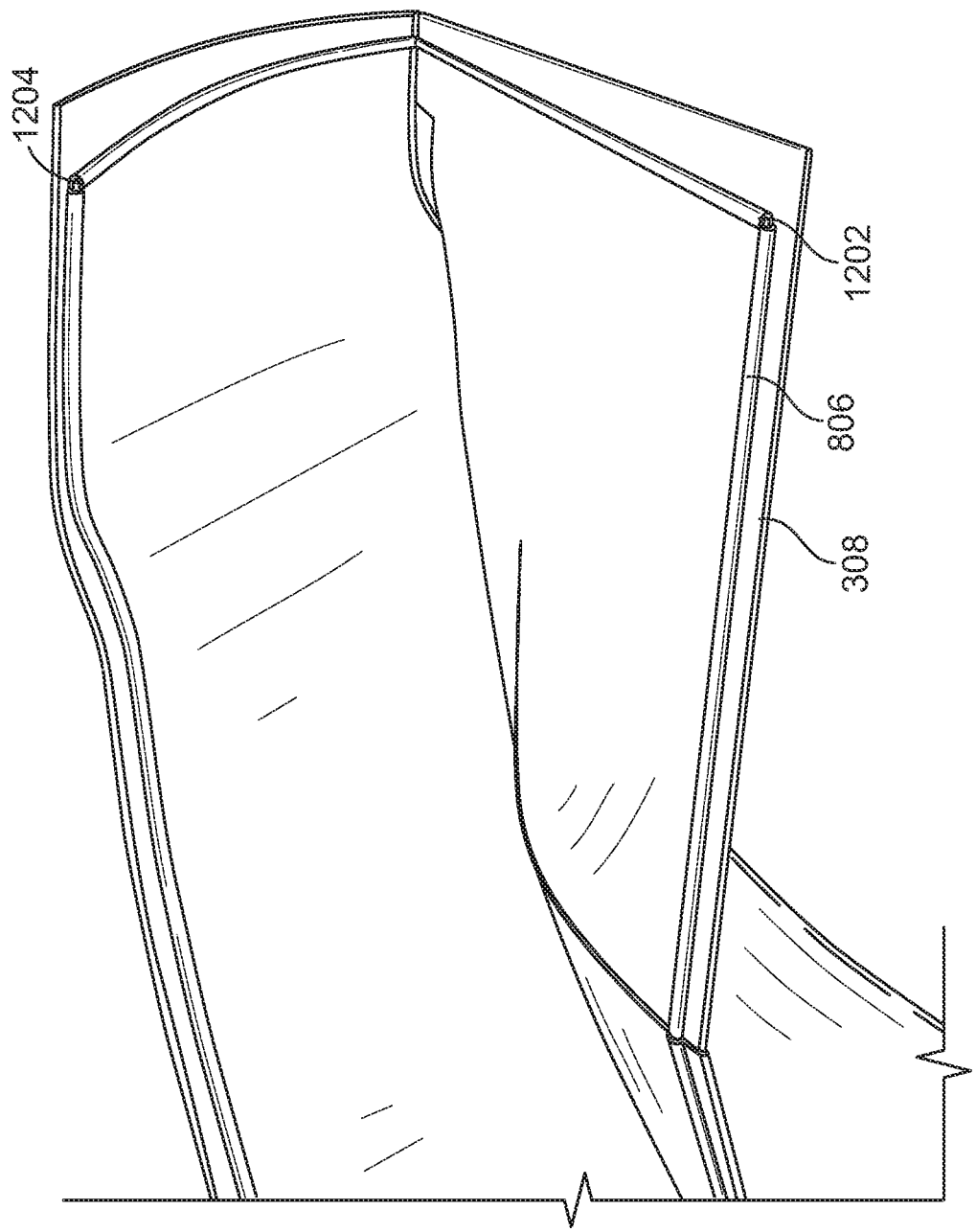

METHODS AND APPARATUS FOR SEALING VARIABLE AREA FAN NOZZLES OF JET ENGINES

RELATED APPLICATION

This patent arises from a continuation of U.S. application Ser. No. 13/665,188, titled "Methods and Apparatus for Sealing Variable Area Fan Nozzles of Jet Engines," and filed Oct. 31, 2012, which is hereby incorporated by this reference in its entirety.

FIELD OF THE DISCLOSURE

This patent relates to sealing variable area fan nozzles and, more specifically, to methods and apparatus for sealing variable area fan nozzles of jet engines.

BACKGROUND

Variable area fan nozzle (VAFN) actuation systems may be used in aerospace applications to adjust an operating point of a propulsion system to adapt to different flight conditions.

SUMMARY

An apparatus in accordance with the teachings of this disclosure includes a frame and a seal to be coupled to the frame. The seal is to enclose petals of a variable area fan nozzle to substantially prevent airflow between the petals.

An example aircraft variable area fan nozzle petal actuation system seal assembly includes a frame and a seal coupled to the frame to substantially enclose the variable area fan nozzle petal actuation system between the frame and seal.

An example method of sealing an aircraft variable area fan nozzle petal actuation system includes disposing the variable area fan nozzle petal actuation system within a seal assembly formed by a frame and a seal coupled to the frame to enclose the variable area fan nozzle petal actuation system between the frame and seal.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIGS. 11 and 12 depict different views of an example seal that can be used to implement the examples disclosed herein.

DETAILED DESCRIPTION

Figure 1:
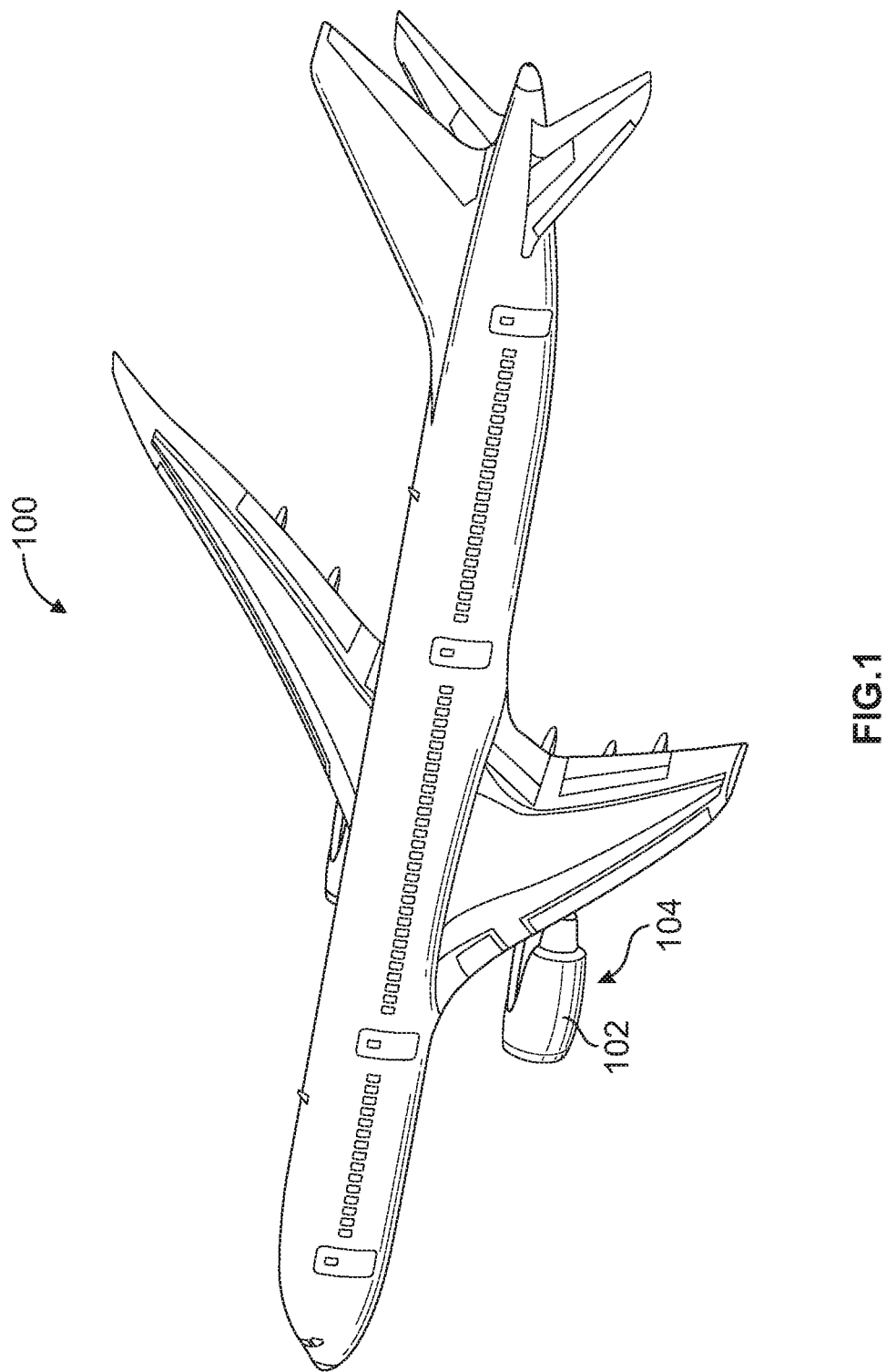
FIG. 1 depicts an example airplane including an example sealed variable area fan nozzle in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to jet engines and/or aircrafts including such jet engines having sealed variable area fan nozzles (VAFN) that reduce the weight and/or increase the performance of aircrafts. Specifically, the examples disclosed herein relate to sealed VAFN petal actuation systems that increase aircraft fuel efficiency by sealing and/or preventing air leaks through the petals of the VAFN.

In some examples, the example seal assemblies include a frame and a single-piece seal that completely encloses the VAFN petal actuation system between the frame and the seal, thereby reducing the possibility of leaks therethrough. The seal may be positioned and/or stretched onto the frame in tension to ensure the example seal seals against the petals (e.g., eight petals) as the petals move relative to the core cowl and/or the nozzle exhaust of the jet engine. In the regard, the seal assembly, that is, the frame and seal, and the VAFN petal actuation system may be correspondingly shaped. In some examples, when the petals are in a contracted position, the example seal is in lesser tension and, when the petals transition to an expanded position, the seal is under increased tension. The seal may define pockets to accommodate and/or enable the movement of the petals. To substantially prevent the seal from wearing and/or being damaged when moving relative to and/or rubbing against the frame, the frame may include urethane and/or other materials that minimize such wear.

The frame may be used to support, secure and/or couple the seal, petal hinges, sensors and/or systems of the VAFN. The sensors (e.g., proximity sensors) may be used to identify the position of the system, the petals, etc. In some examples, to seal, couple, retain and/or secure the seal relative to the frame, the seal includes a perimeter bead, ridge, projection and/or tongue that is received in and/or mates with a groove and/or channel of the frame. The bead and corresponding groove may include radiused corners to substantially reduce forces imparted on the seal. The seal may be positioned on a first side of the frame adjacent the petals and/or a thrust reverser cover and on a second side of the frame adjacent the petals and/or the thrust reverser cover. The thrust reverser cover may cover at least a top portion of the seal and a bottom portion of the seal such that the seal is positioned between the frame and the thrust reverser cover on both the first and second sides of the frame. One or more fasteners (bolts, rivets, screws, etc.) may be used to couple the thrust reverser cover, the seal and/or the frame together.

FIG. 1 illustrates an example aircraft 100 including jet engines 102 in accordance with the teachings of this disclosure. In some examples, the engines 102 include sealed variable area fan nozzles (VAFN) 104 that increase fuel efficiency of the aircraft 100 by sealing and/or preventing air leaks through movable petals of the VAFN 104.

Figure 2:
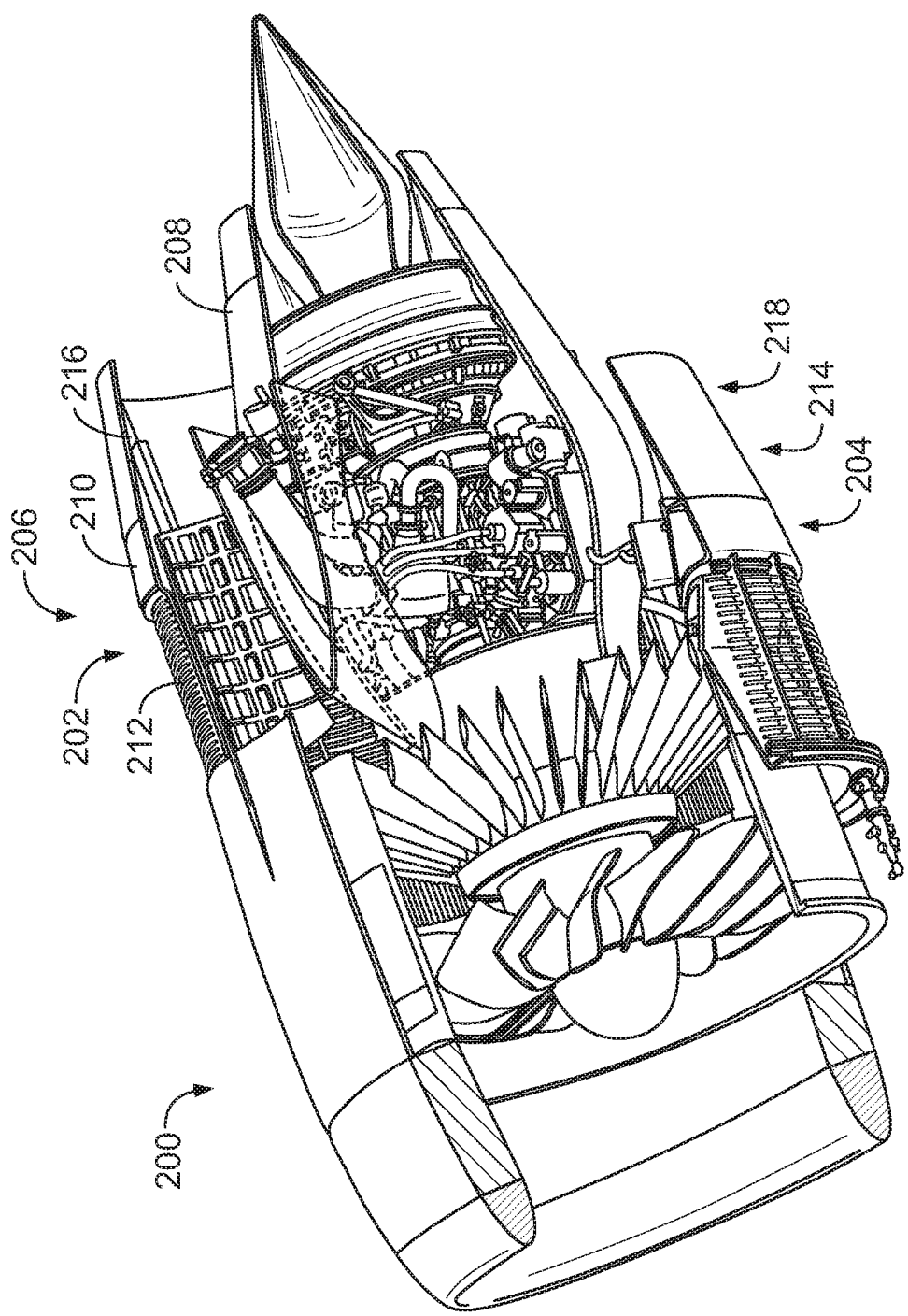
FIG. 2 depicts an example jet engine in accordance with the teachings of this disclosure.

FIG. 2 illustrates an example jet engine 200 in accordance with the teachings of this disclosure. The engine 200 includes a thrust reverser 202 illustrated in a forward position 204 and a rearward position 206. In the forward position 204, air flows through the engine 200 between a core cowl 208 and an example thrust reverser cover 210. In the rearward position 206, air flows through apertures 212 of the thrust reverser 202.

When in the forward position 204, to enable the engine 200 to adapt to different flight conditions, the engine 200 includes a VAFN 214 including a plurality of petals 216 that are actuatable and/or movable to change (e.g., increase and/or decrease) the area between the core cowl 208 and the thrust reverser cover 210. In this example, the petals 216 are positioned in an example seal assembly 218 that substantially seals and/or prevents leaks through the petals 216 to increase the fuel efficiency of the engine 200.

Figure 3:
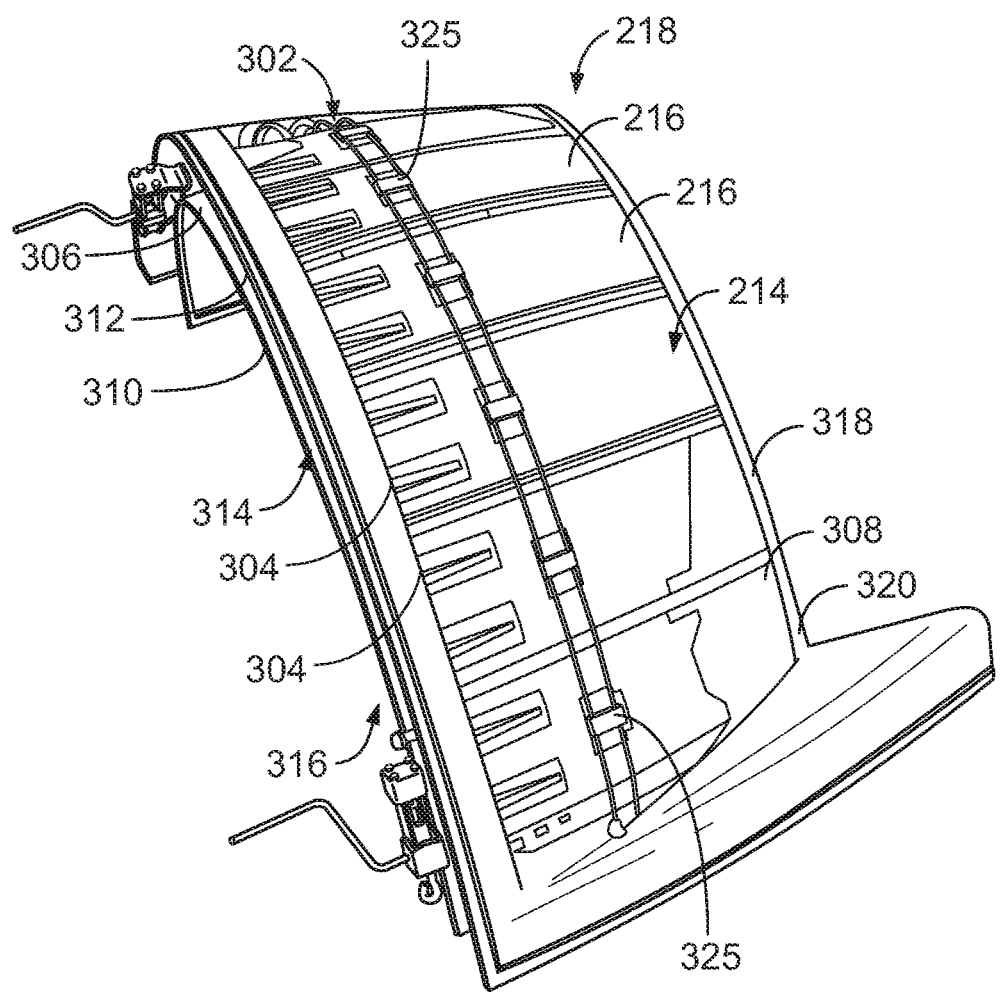
FIG. 3 is a partial cutaway view depicting an example variable area fan nozzle enclosed within an example seal assembly in accordance with the teachings of this disclosure.

FIG. 3 is a partial cutaway view illustrating the example seal assembly 218 including the VAFN 214 and enclosed therein. In the illustrated example of FIG. 3, a portion of the seal assembly 218 has been removed from the figure to allow the petals 216 via brackets 325 of the VAFN 214 position within the enclosed seal assembly 218 to be visualized. In this example, the VAFN 214 includes an actuation system, actuator, rods and/or cables 302 coupled via brackets 325 to each of the petals 216 to pivot the petals 216 about hinges 304 within the seal assembly 218 and increase and/or decrease the area between the seal assembly 218 and the core cowl 208. As shown in the illustrated example of FIG. 3, the rods and/or cables 302 extend (e.g., movably extend) through the brackets 325 to enable the rods and/or cables 302, when actuated, to cause the petals 216 to taper outwardly relative to the hinges 304 to increase the area between the seal assembly 218 and the core cowl 208. Further, as shown in the illustrated example of FIG. 3, the rods and/or cables 302 extend through the brackets 325 to enable the rods and/or cables 302, when actuated, to cause the petals 216 to taper inwardly relative to the hinges 304 to decrease the area between the seal assembly 218 and the core cowl 208.

Figure 4:
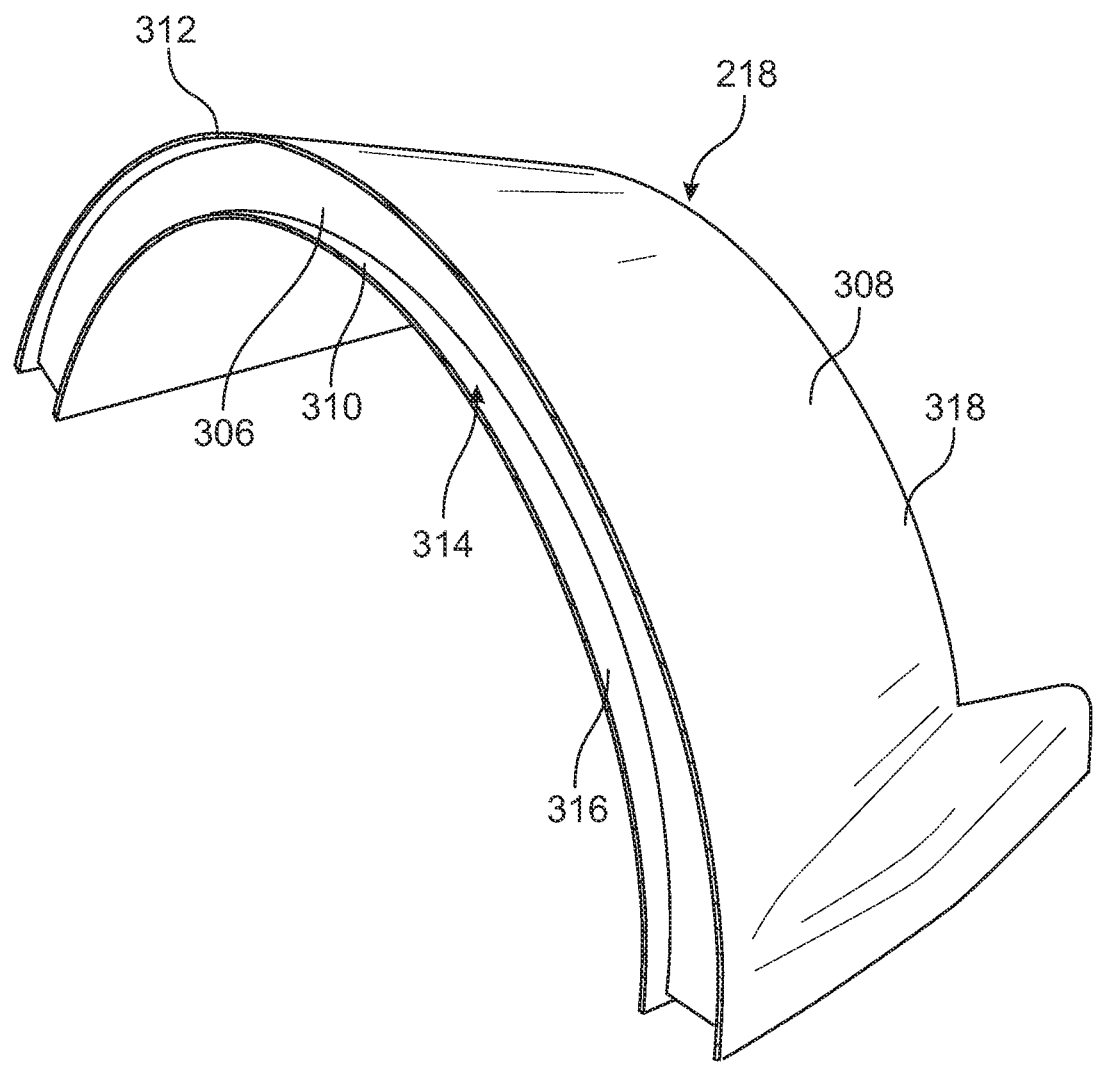
FIGS. 4-9 depict different views of an example seal assembly in accordance with the teachings of this disclosure.

Referring to FIGS. 3-4, the example seal assembly 218 includes a frame 306 to which a seal 308 is coupled, connected, linked, secured, or otherwise joined. The frame 306 may be made of any suitable material such as, for example, Inco 625 Stainless Steel. The seal 308 may be made of a single piece of material and/or multiple pieces of material (e.g., an elastomeric seal material) having edges 310, 312 that define an opening 314 at a first end 316 of the seal assembly 218 and a folded portion and/or fold 318 at a second end 320 of the seal assembly 218. In operation, the petals 216 move based on the flight condition and the seal 308 sealingly moves with the petals 216 substantially preventing airflow between the petals 216.

Figure 5:
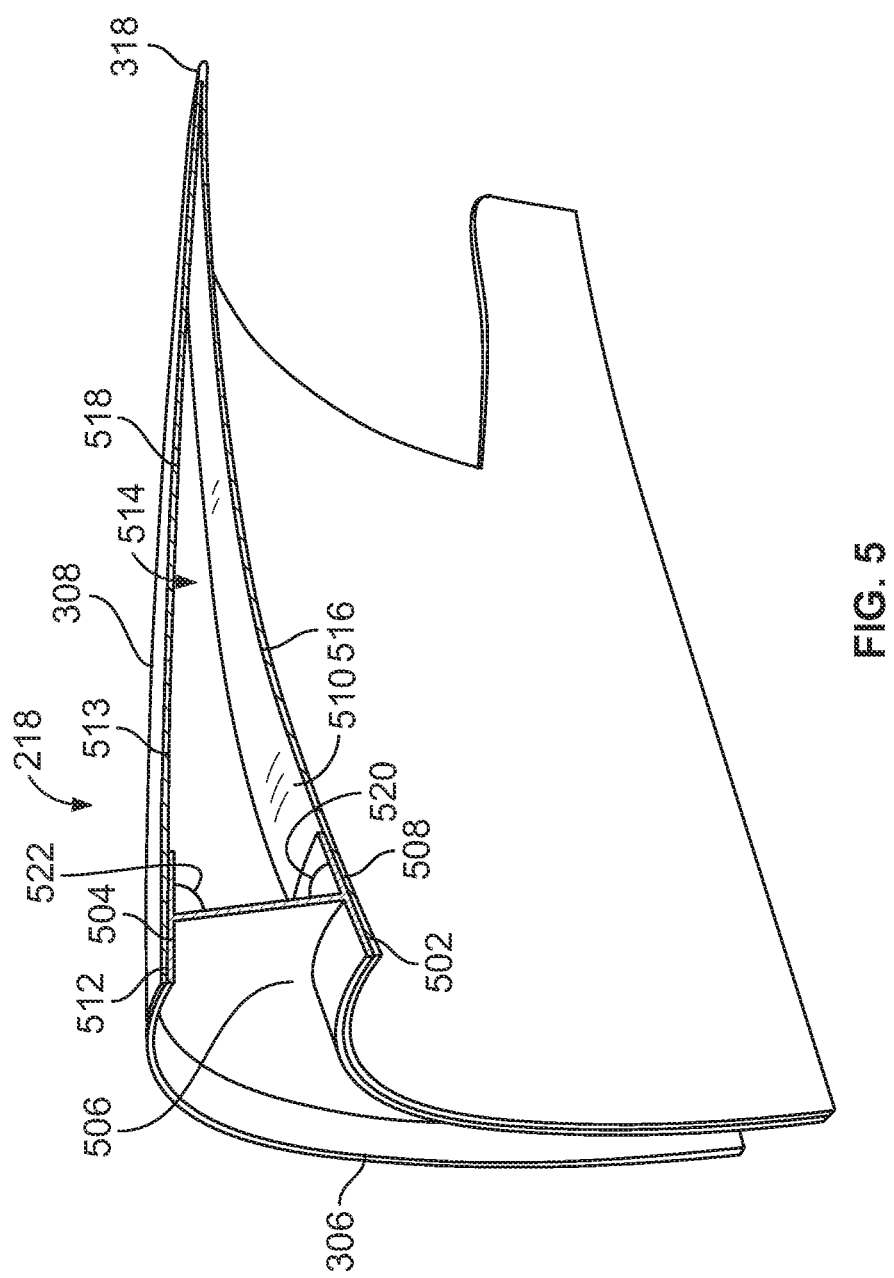
Figure 6:
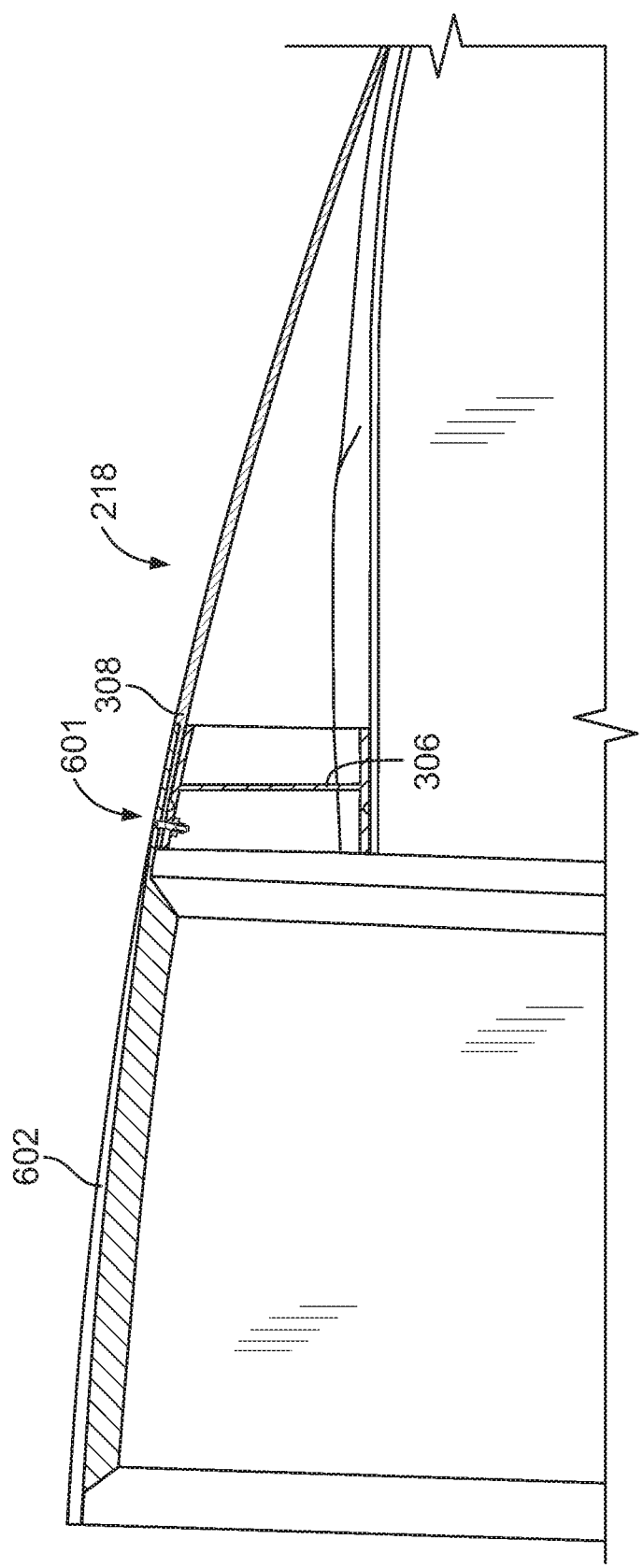
Figure 7:
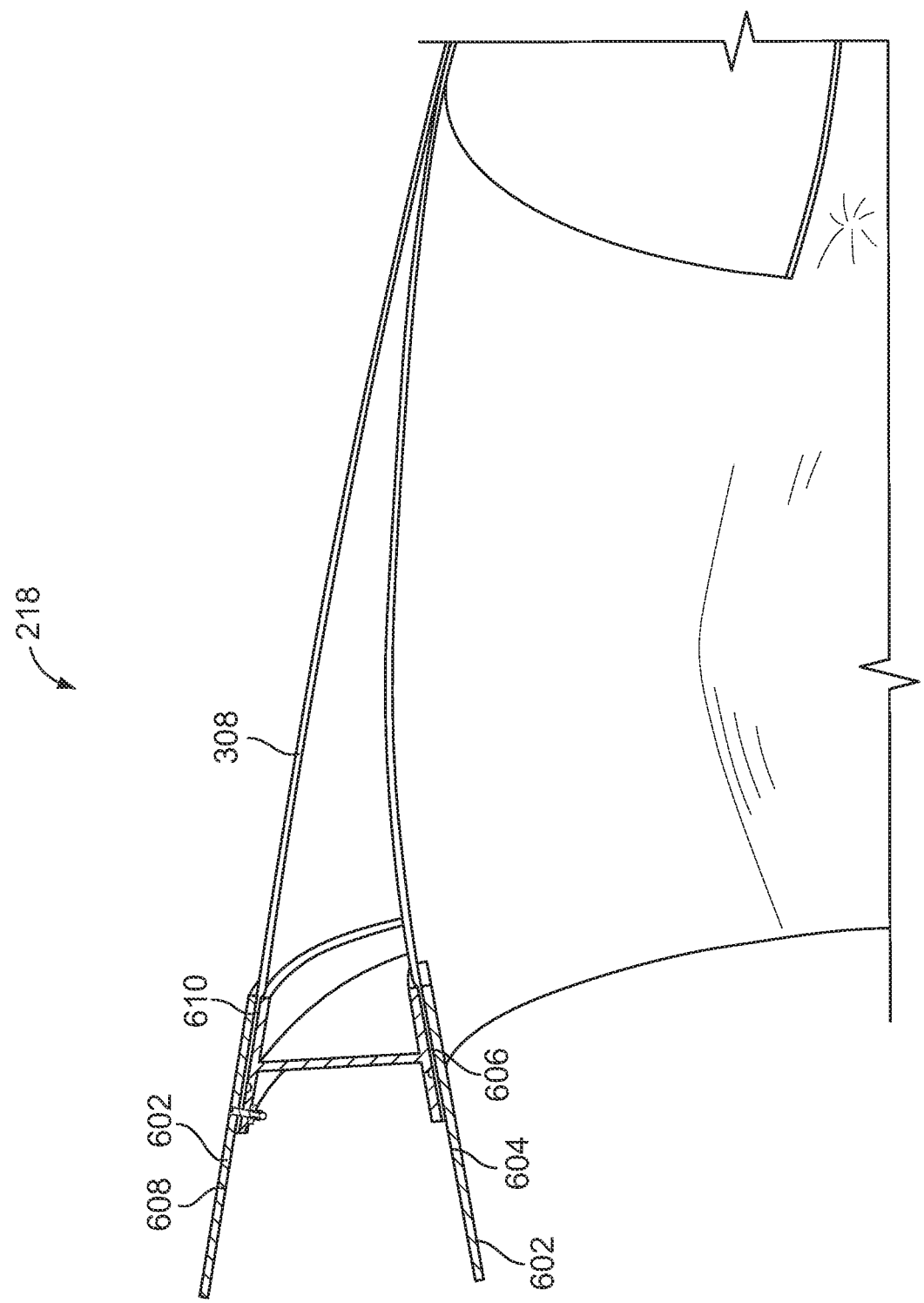

FIGS. 5-7 illustrate cross-sectional views of the example seal assembly 218. As shown, the example frame 306 includes a first portion 502, a second portion 504 and a third portion 506 positioned between the first and second portions 502 and 504. In some examples, a first angle 520 is formed at an intersection between the first portion 502 and the third portion 506 and a second angle 522 is formed at an intersection between the second portion 504 and the third portion 506. In some examples, the first angle 520 is different from the second angle 522. The first portion 502 includes a first outer surface 508 adjacent and coupled to a first inner surface 510 of the seal 308 and the second portion 504 includes a second outer surface 512 adjacent and coupled to a second inner surface 513 of the seal 308. The coupling between the frame 306 and the seal 308 defines a chamber 514 into which the VAFN 214 is to be positioned. The seal 308 includes a first panel 516 and a second panel 518 that are folded about the folded portion 318.

FIGS. 6 and 7 illustrate an overlap 601 of a thrust reverser cover 602 on the seal 308. Referring to FIG. 7, in some examples, the thrust reverser cover 602 includes a first inner surface 604 adjacent and coupled to a first outer surface 606 of the seal 308 and the thrust reverser cover 602 includes a second inner surface 608 adjacent and coupled to a second outer surface 610 of the seal 308.

Figure 8:
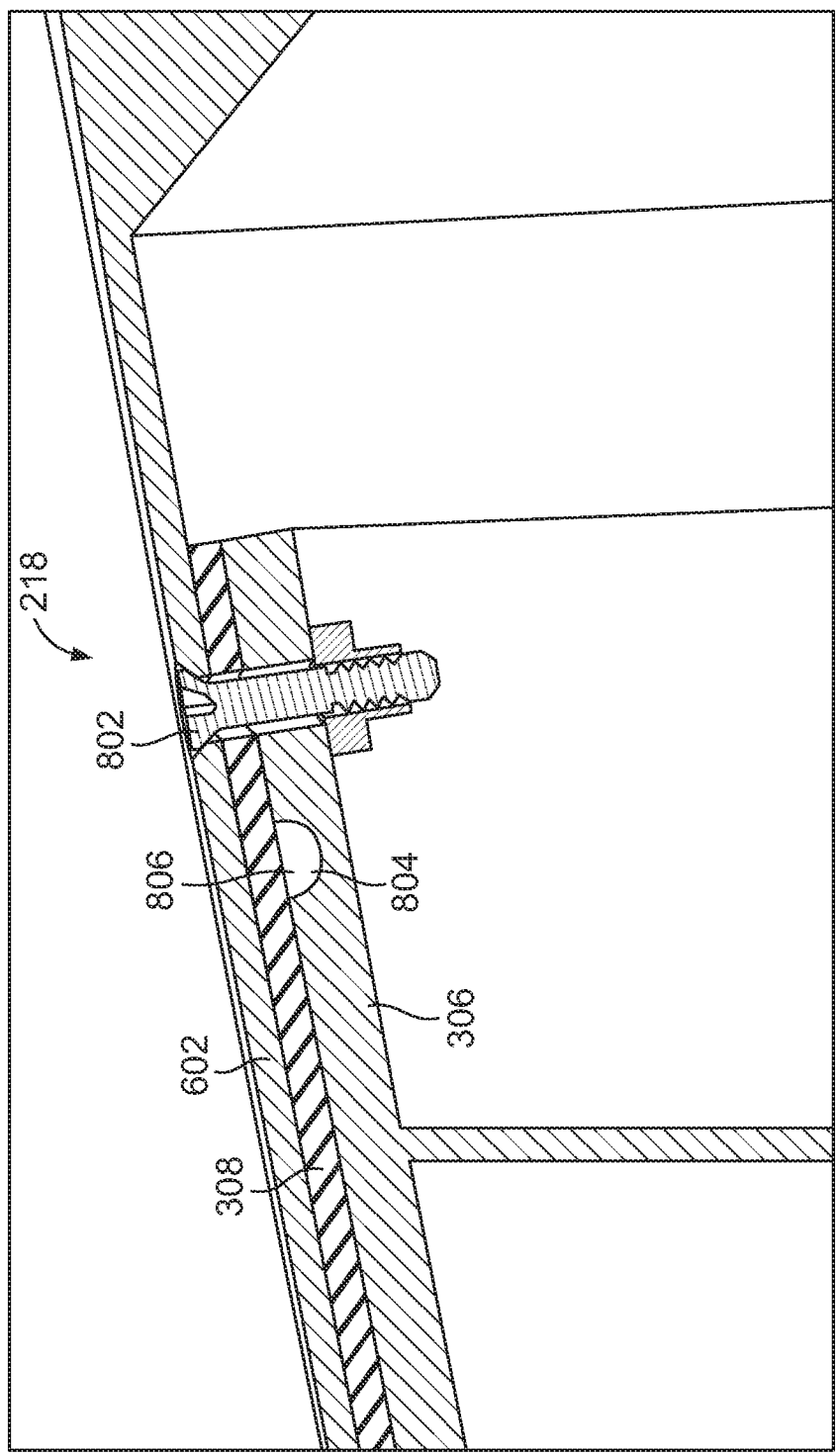

FIG. 8 illustrates a coupling between the thrust reverser cover 602, the seal 308 and the frame 306. In this example, a fastener 802 extends through the thrust reverser cover 602, the seal 308 and the frame 306 to couple the components 602, 306, 308 together. Additionally, in this example, the frame 306 defines a groove 804 that receives a projection (e.g., a perimeter projection) 806 of the seal 308 to couple the seal 308 and the frame 306 together.

Figure 9:
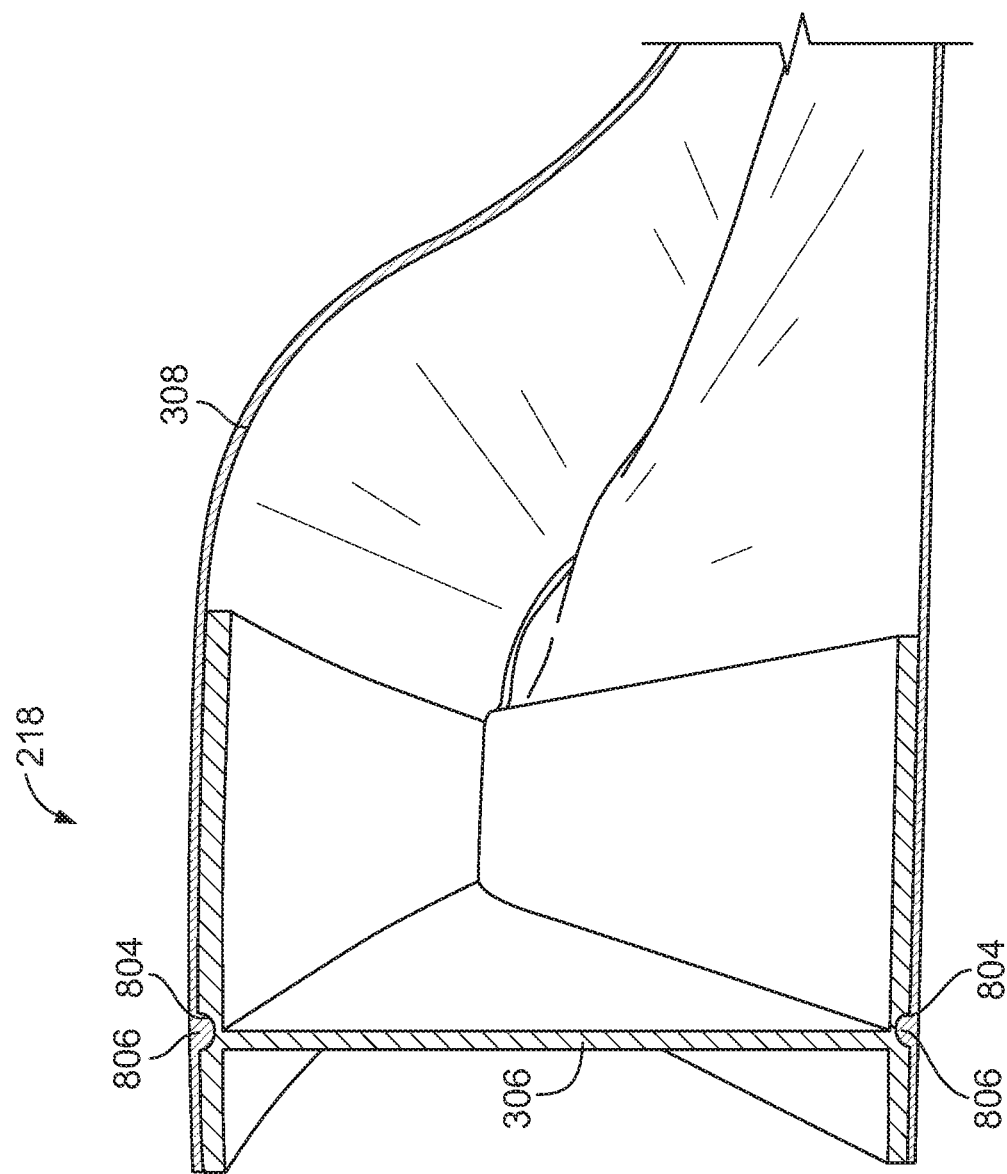

FIG. 9 illustrates another view of the groove 804 of the frame 306 receiving the projection 806 of seal 308.

Figure 10:
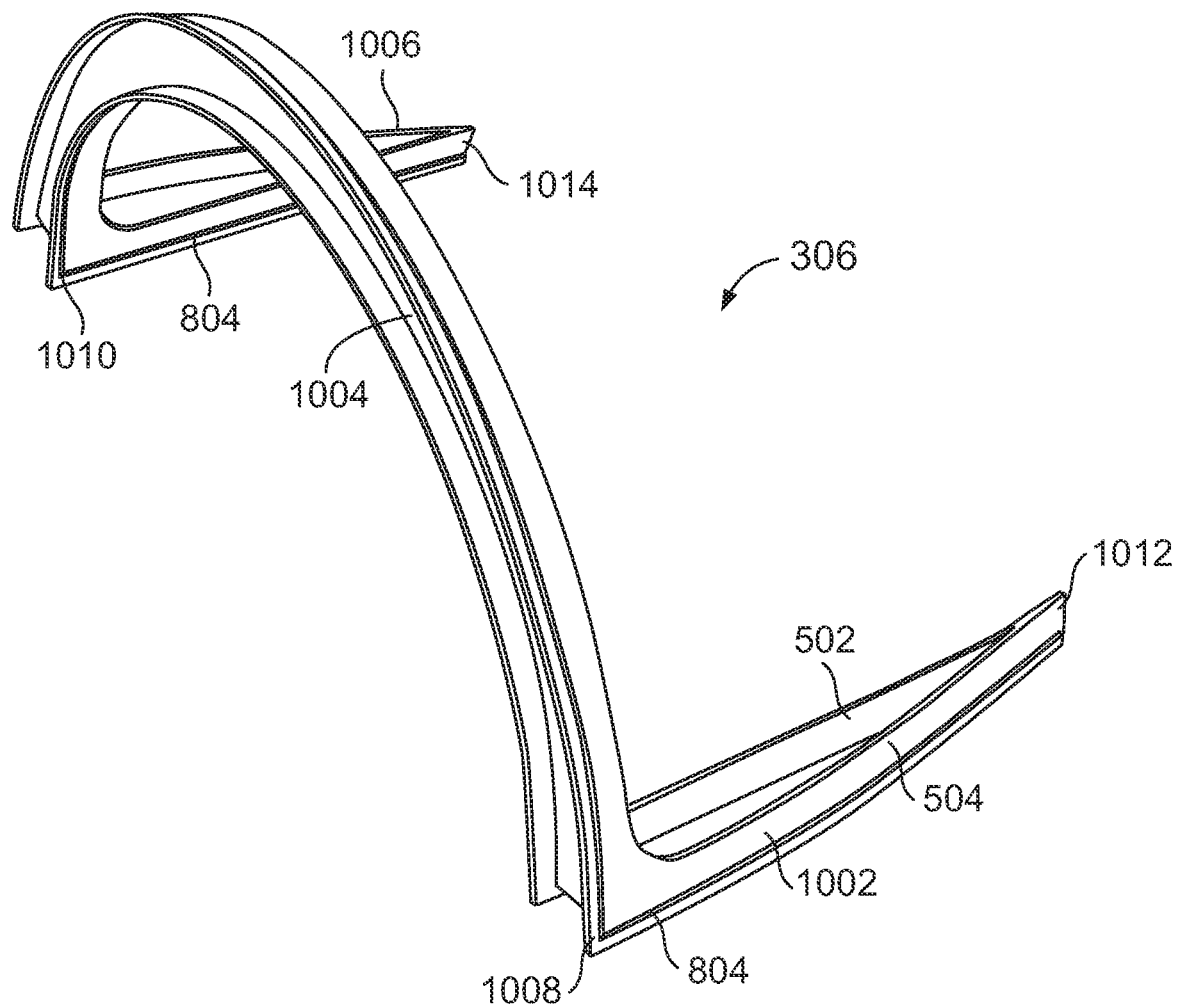
FIG. 10 depicts an example frame that can be used to implement the examples disclosed herein.

FIG. 10 illustrates an isometric view of the frame 306. The frame 306 includes a first leg or portion 1002, a curved or second portion 1004 and a second leg or third portion 1006. The legs 1002 and 1006 extend from respective ends 1008, 1010 of the curved portion 1004. In this example, the portions 502, 504 on the legs 1002, 1006 converge at and/or taper toward respective ends 1012, 1014.

The legs 1002, 1006 and the curved portion 1004 include and/or define opposing grooves 804 that receive the projection 806 of the seal 308. While the grooves 804 adjacent the ends 1008, 1010 are depicted as including approximately 90-degree corners, in other examples, the grooves 804 adjacent the ends 1008, 1010 may be curved and/or radiused (e.g., a two-inch radius).

Figure 11:
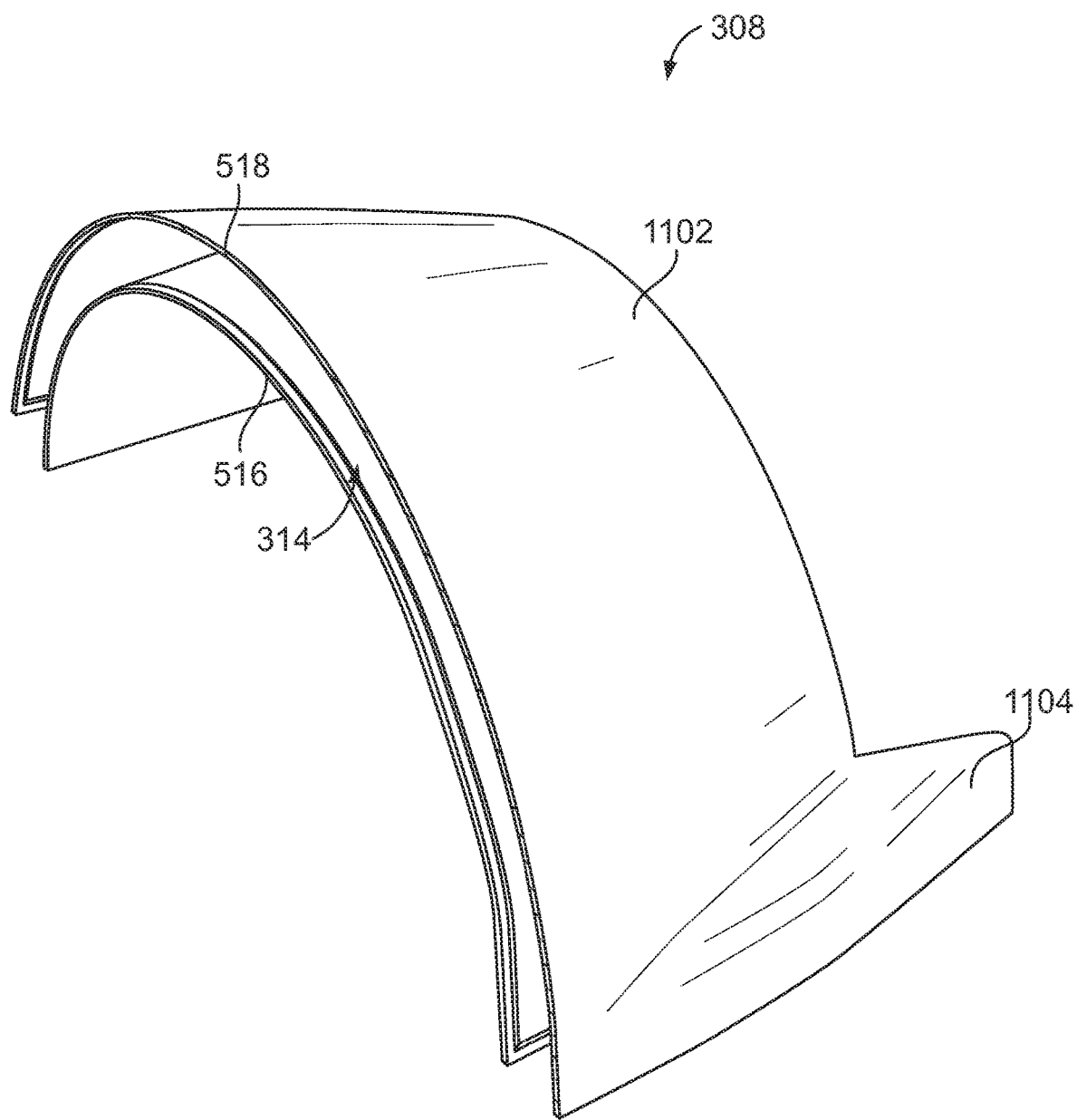

FIG. 11 illustrates the seal 308 including the first panel 516 and the second panel 518. The panels 516, 518 are spaced adjacent the opening 314 to enable the curved portion 1004 of the frame 306 to be received therein. In this example, the seal 308 includes a central curved portion 1102 in which the petals 216 may be positioned and portions and/or extensions 1104 to receive the legs 1002, 1006. In the regard, the seal assembly 218, that is, the frame 306 and seal 308, and the variable area fan nozzle petal actuation system 104 may be correspondingly shaped.

FIG. 12 illustrates the projection(s) 806 on the seal 308. While the projection 806 is illustrated as including substantially non-radiused corners 1202, 1204, the corners 1202, 1204 may be curved and/or radiused.

As set forth herein, an example apparatus includes a frame and a seal to be coupled to the frame. The seal is to enclose petals of a variable area fan nozzle to substantially prevent airflow between the petals. In some examples, the seal includes a projection and the frame includes a groove to receive the projection. In some examples, the seal includes opposing inner surfaces. The opposing inner surfaces are to be positioned adjacent opposing outer surfaces of the frame. In some examples, the frame includes a first portion, a second portion, and a third portion. The second portion is positioned between the first and third portions.

In some examples, the first portion and the third portion include grooves to receive a projection of the seal. In some examples, the second portion is substantially perpendicular relative to a longitudinal axis of the variable area fan nozzle. In some examples, the first portion includes a first angle relative to the longitudinal axis of the variable area fan nozzle and the third portion includes a second angle relative to the longitudinal axis of the variable area fan nozzle. The first angle is different than the second angle. In some examples, the frame includes a first portion, a curved portion, and a second portion. The first portion is to extend from a first end of the curved portion. The second portion is to extend from a second end of the curved portion.

In some examples, the seal includes a single-piece of material. In some examples, the seal includes a first end and a second end. The first end comprising an opening to receive the frame, the second end to comprise a fold. In some examples, the frame includes urethane to interface with the seal. The urethane to substantially reduce damage of the seal based on interaction with the frame.

Another example apparatus includes a thrust reverser cover having a variable area fan nozzle. The apparatus includes a seal assembly to enclose petals of the variable area fan nozzle to substantially prevent airflow between the petals. In some examples, the seal assembly includes a frame and a seal to be coupled to the frame. The seal to enclose the petals of the variable area fan nozzle. In some examples, the seal includes a projection and the frame includes a groove to receive the projection.

In some examples, the seal includes opposing inner surfaces. The respective inner surfaces are to be positioned adjacent respective opposing outer surfaces of the frame. In some examples, the frame includes a first portion, a second portion, and a third portion. The second portion is positioned between the first and third portions. In some examples, the frame includes a first portion, a curved portion, and a second portion, the first portion to extend from a first end of the curved portion, the second portion portion to extend from a second end of the curved portion. In some examples, the seal includes a single-piece of material. In some examples, the seal includes a first end and a second end. The first end includes an opening to receive the frame. The second end is to include a fold.

An example method to enhance the operation of a variable area fan nozzle includes using a seal fabricated from a piece of material that mates to a structure and forms a rigid outer edge along a perimeter of the material and allows the piece of material to overlap the structure.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An aircraft engine comprising:
   a variable area fan nozzle including a plurality of petals; and
   a seal assembly including:
   a frame; and
   a seal including a first elastomeric panel and a second elastomeric panel, the first and second elastomeric panels having fore edges that are spaced apart from each other and aft edges that are coupled to each other, the first and second elastomeric panels coupled to the frame at or near the fore edges of the first and second elastomeric panels such that a chamber is defined by the frame and the first and second elastomeric panels, the plurality of petals coupled to the frame and disposed within the chamber.

2. The aircraft engine of claim 1, wherein the frame includes an outer radial wall and an inner radial wall, the first and second elastomeric panels coupled to the outer and inner radial walls, respectively, at or near the fore edges of the first and second elastomeric panels.

3. The aircraft engine of claim 2, wherein an inner surface of the first elastomeric panel is coupled to an outer surface of the outer radial wall, and an inner surface of the second elastomeric panel is coupled to an outer surface of the inner radial wall, such that the frame is disposed between the first and second elastomeric panels.

4. The aircraft engine of claim 3, further including a thrust reverser cover, wherein the seal assembly is coupled to the thrust reverser cover.

5. The aircraft engine of claim 4, wherein the thrust reverser cover includes an outer wall and an inner wall, the seal assembly coupled between the outer wall and the inner wall of the thrust reverser, the first elastomeric panel of the seal disposed between the outer wall of the thrust reverser cover and the outer radial wall of the frame, and the second elastomeric panel of the seal disposed between the inner wall of the thrust reverser cover and the inner radial wall of the frame.

6. The aircraft engine of claim 4, further including a fastener extending through the thrust reverser cover, the seal, and the frame to couple the thrust reverser cover, the seal, and the frame.

7. The aircraft engine of claim 1, wherein the chamber has a tapered cross-section that decreases in height from the fore edges of the first and second elastomeric panels to the aft edges of the first and second elastomeric panels.

8. The aircraft engine of claim 1, wherein the aircraft engine includes a core cowl, and wherein the second elastomeric panel is disposed between the plurality of petals and the core cowl.

9. The aircraft engine of claim 1, wherein the frame includes a curved portion, a first leg extending rearward from a first end of the curved portion, and a second leg extending rearward from a second end of the curved portion.

10. The aircraft engine of claim 9, wherein the frame includes a first groove extending along an outer surface of the curved portion, the first leg, and the second leg, and the frame includes a second groove extending along an inner surface of the curved portion, the first leg, and the second leg.

11. The aircraft engine of claim 10, wherein an inner surface of the first elastomeric panel has a first projection to mate with the first groove and an inner surface of the second elastomeric panel has a second projection to mate with the second groove.

12. The aircraft engine of claim 1, wherein the first and second elastomeric panels flex as the petals expand or contract in the chamber.

13. The aircraft engine of claim 1, wherein the variable area fan nozzle includes an actuation system to move the petals, the actuation system disposed within the chamber.

14. The aircraft engine of claim 2, wherein the frame includes an intermediate wall extending between the outer radial wall and the inner radial wall, and wherein the intermediate wall extends in a direction that is perpendicular to a longitudinal axis of the variable area fan nozzle.

15. The aircraft engine of claim 6, wherein the frame includes an intermediate wall extending between the outer radial wall and the inner radial wall, and wherein the fastener is forward of the intermediate wall.

16. The aircraft engine of claim 13, wherein the actuation system includes cables coupled to each of the petals.

17. The aircraft engine of claim 1, wherein each of the petals is hingedly coupled to the frame.

18. The aircraft engine of claim 1, wherein the frame includes urethane to reduce wear between the frame and the seal.

19. The aircraft engine of claim 1, wherein the chamber is wedge-shaped.

20. The aircraft engine of claim 1, wherein the seal is constructed of a single piece of material.

\* \* \* \* \*